United States Patent
Nakamura et al.

(10) Patent No.: US 10,621,331 B2
(45) Date of Patent: Apr. 14, 2020

(54) VEHICLE DATA REWRITE CONTROL DEVICE AND VEHICLE DATA REWRITE AUTHENTICATION SYSTEM

(71) Applicant: Hitachi Automotive Systems, Ltd., Hitachinaka-shi, Ibaraki (JP)

(72) Inventors: Masaaki Nakamura, Hitachinaka (JP); Kazuhiro Nakanishi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 31 days.

(21) Appl. No.: 15/569,423

(22) PCT Filed: Jun. 15, 2016

(86) PCT No.: PCT/JP2016/067714
§ 371 (c)(1),
(2) Date: Oct. 26, 2017

(87) PCT Pub. No.: WO2017/002611
PCT Pub. Date: Jan. 5, 2017

(65) Prior Publication Data
US 2018/0300472 A1    Oct. 18, 2018

(30) Foreign Application Priority Data

Jun. 30, 2015   (JP) .............................. 2015-130560

(51) Int. Cl.
*H04L 29/06* (2006.01)
*G06F 21/45* (2013.01)
(Continued)

(52) U.S. Cl.
CPC ............... *G06F 21/45* (2013.01); *G06F 8/65* (2013.01); *G06F 8/654* (2018.02); *G06F 21/44* (2013.01);
(Continued)

(58) Field of Classification Search
CPC ...................................................... G06F 21/45
See application file for complete search history.

(56) References Cited

U.S. PATENT DOCUMENTS 5,926,103 A * 7/1999 Petite .................. G08B 25/016
340/531
6,604,027 B1 * 8/2003 Kawakami .......... G06F 12/1466
700/79
(Continued)

FOREIGN PATENT DOCUMENTS

EP    1 109 085 A2    6/2001
EP    1 583 039 A1    10/2005
(Continued)

OTHER PUBLICATIONS

International Search Report (PCT/ISA/210) issued in PCT Application No. PCT/JP2016/067714 dated Sep. 27, 2016 with English translation (4 pages).
(Continued)

*Primary Examiner* — Shawnchoy Rahman
(74) *Attorney, Agent, or Firm* — Crowell & Moring LLP

(57) ABSTRACT

The purpose of the present invention is to provide a vehicle data rewrite control device and a data rewrite authentication system which prevent unauthorized rewriting of data due to password leakage and/or by spoofing of a connected device. The vehicle data rewrite control device outputs authentication information generated on the basis of data to be updated and a pre-stored vehicle number. In addition, the vehicle data rewrite authentication system comprises: a vehicle having an information processing device which contains pre-stored data to be updated and a vehicle number for the vehicle for which the data is updated and which generates first authentication information from the data and the vehicle number, and the vehicle data rewrite control device which generates and outputs second authentication information on (Continued)

the basis of the data and the vehicle number received from the information processing device; and a vehicle-user communication terminal which, when the updating of the data is permitted on the basis of the second authentication information received from the vehicle, outputs the second authentication information to the information processing device, wherein the information processing device determines whether or not the updating of the data is to be permitted by collating the first authentication information with the second authentication information received from the communication terminal.

8 Claims, 19 Drawing Sheets

(51) Int. Cl.
| | |
|---|---|
| G06F 21/44 | (2013.01) |
| G06F 8/65 | (2018.01) |
| H04W 12/10 | (2009.01) |
| G06F 8/654 | (2018.01) |
| H04W 12/00 | (2009.01) |
| H04W 12/06 | (2009.01) |
| H04W 4/40 | (2018.01) |
| H04L 29/08 | (2006.01) |

(52) U.S. Cl.
CPC ..... *H04L 63/0853* (2013.01); *H04W 12/0023* (2019.01); *H04W 12/06* (2013.01); *H04W 12/10* (2013.01); *G06F 2221/2117* (2013.01); *H04L 63/083* (2013.01); *H04L 67/12* (2013.01); *H04L 67/34* (2013.01); *H04L 2209/84* (2013.01); *H04W 4/40* (2018.02); *H04W 12/00503* (2019.01); *H04W 12/00512* (2019.01)

(56) References Cited

U.S. PATENT DOCUMENTS

| | | | |
|---|---|---|---|
| 7,093,131 B1* | 8/2006 | Kobayashi | H04L 9/3247 380/258 |
| 2002/0046344 A1* | 4/2002 | Naito | G06F 21/572 713/189 |
| 2005/0159885 A1 | 7/2005 | Nomura | |
| 2012/0197488 A1* | 8/2012 | Lee | H04L 63/0861 701/36 |
| 2013/0132686 A1* | 5/2013 | Nishiyama | G06F 8/654 711/154 |
| 2013/0254469 A1* | 9/2013 | Miyake | G06F 8/654 711/103 |
| 2014/0114497 A1 | 4/2014 | Miyake | |
| 2015/0052352 A1* | 2/2015 | Dolev | H04W 12/06 713/156 |
| 2016/0224806 A1* | 8/2016 | Takada | G06F 21/64 |

FOREIGN PATENT DOCUMENTS

| | | | |
|---|---|---|---|
| EP | 1975897 A2 * | 10/2008 | B60R 25/00 |
| JP | 3001773 B2 * | 1/2000 | |
| JP | 2005-233930 A | 9/2005 | |
| JP | 2013-37474 A | 2/2013 | |
| KR | 20070082966 A * | 8/2007 | |
| WO | WO 2011/070629 A1 | 6/2011 | |

OTHER PUBLICATIONS

Japanese-language Written Opinion (PCT/ISA/237) issued in PCT Application No. PCT/JP2016/067714 dated Sep. 27, 2016 (4 pages).
Extended European Search Report issued in counterpart European Application No. 16817720.2 dated Oct. 23, 2018 (seven (7) pages).

* cited by examiner

FIG. 9A

NOTIFICATION OF PROGRAM
UPDATE SUSPENSION OF VEHICLE

◆ PROGRAM UPDATE OF YOUR
  VEHICLE FAILED.
  PLEASE VISIT NEAR SERVICE
  CENTER.

FIG. 9B

NOTIFICATION OF PROGRAM
UPDATE SUSPENSION OF VEHICLE

◆ MISMATCHING OCCURRED
  WHILE CHECKING PROGRAM
  UPDATE.
  PLEASE VISIT NEAR SERVICE
  CENTER.

FIG. 13

NOTIFICATION OF PROGRAM UPDATE
SUSPENSION OF VEHICLE

◆ PROGRAM UPDATE IS EXPIRED.
NOTIFICATION OF PROGRAM
UPDATE WILL BE MADE AGAIN
WHEN USING VEHICLE.

FIG. 17

NOTIFICATION OF PROGRAM UPDATE
SUSPENSION OF VEHICLE

◆ YOUR VEHICLE IS OUT OF
SERVICE AREA.
PLEASE VISIT NEAR SERVICE
CENTER.

VEHICLE DATA REWRITE CONTROL DEVICE AND VEHICLE DATA REWRITE AUTHENTICATION SYSTEM

TECHNICAL FIELD

The present invention relates to a data rewrite control device and a data rewrite authentication system, and particularly to a vehicle data write control device and a vehicle data rewrite authentication system.

BACKGROUND ART

In recent years, a data updating frequency in an ECU (Engine Control Unit) mounted in a vehicle is expected to increase as driving support functions of a vehicle increase. On the other hand, there is an in-vehicle security problem, and it is also desired a remote data update in the ECU at a higher security level. As one of such data updating methods of the ECU, there is a method of downloading data via a wireless line and installing the data in the ECU. In a conventional wireless data update, a password acquired by a user is input to a target vehicle using an input device, and transmitted from the vehicle to a server. Then, the data update is performed after authentication in the server.

CITATION LIST

Patent Literature

PTL 1: JP 2005-233930 A

SUMMARY OF INVENTION

Technical Problem

In the data updating method disclosed in PTL 1, an update data to be distributed is received by the ECU, a password acquired by a user is input to a target vehicle using an input device, and the password is transmitted from the vehicle to a server. The transmitted password is authenticated in the server, and the data update is permitted. Then, the ECU performs the data update. Alternatively, an authentication key issuing request and an authentication key issuing are performed using the same line used for the update data distributed from the server.

In that case, since the input password is used on a plurality of lines, there is a strong possibility that the password is leaked. If the password is leaked, there is a possibility that data is illegally updated. In addition, the update data, the authentication key issuing request, and the authentication key are on the same line. Therefore, in a case where an illegal update data is distributed by spoofing, there is a problem in that the illegal update data is not able to be detected.

An object of the invention is to provide a vehicle data rewrite control device and a data rewrite authentication system in which it is possible to prevent that a password is leaked and data is illegally rewritten by spoofing of a connection device.

Solution to Problem

In order to solve the above issue, a vehicle data rewrite control device according to the present invention performs a data update on a control device in a vehicle, wherein authentication information generated on the basis of data to be updated and a pre-stored vehicle number is output.

In addition, a data rewrite authentication system according to the present invention includes: an information processing device which includes pre-stored data to be updated and a vehicle number for a vehicle for which the data is updated, and which generates first authentication information from the data and the vehicle number; a vehicle which includes a vehicle data rewrite control device to generate and output second authentication information on the basis of the received data from the information processing device and the vehicle number; and a communication terminal of a user of the vehicle which outputs the second authentication information to the information processing device in a case where the data update is permitted on the basis of the second authentication information received from the vehicle, wherein the information processing device collates the first authentication information and the second authentication information received from the communication terminal, and determines whether the data update is permitted.

Advantageous Effects of Invention

According to the invention, it is possible to provide a vehicle data rewrite control device and a data rewrite authentication system in which it is possible to prevent that a password is leaked and data is illegally rewritten by spoofing of a connection device.

BRIEF DESCRIPTION OF DRAWINGS

FIGS. 9A and 9B are examples of the display screen showing a data update mismatching error of the user communication terminal.

FIG. 13 is a diagram illustrating an example of the display screen showing an expiration error according to the second embodiment.

FIG. 17 is a diagram illustrating an example of the display screen showing an error indicating the outside of a data updatable area according to the third embodiment.

DESCRIPTION OF EMBODIMENTS

Hereinafter, embodiments of the invention will be described in detail using the drawings.

First Embodiment

Figure 1:
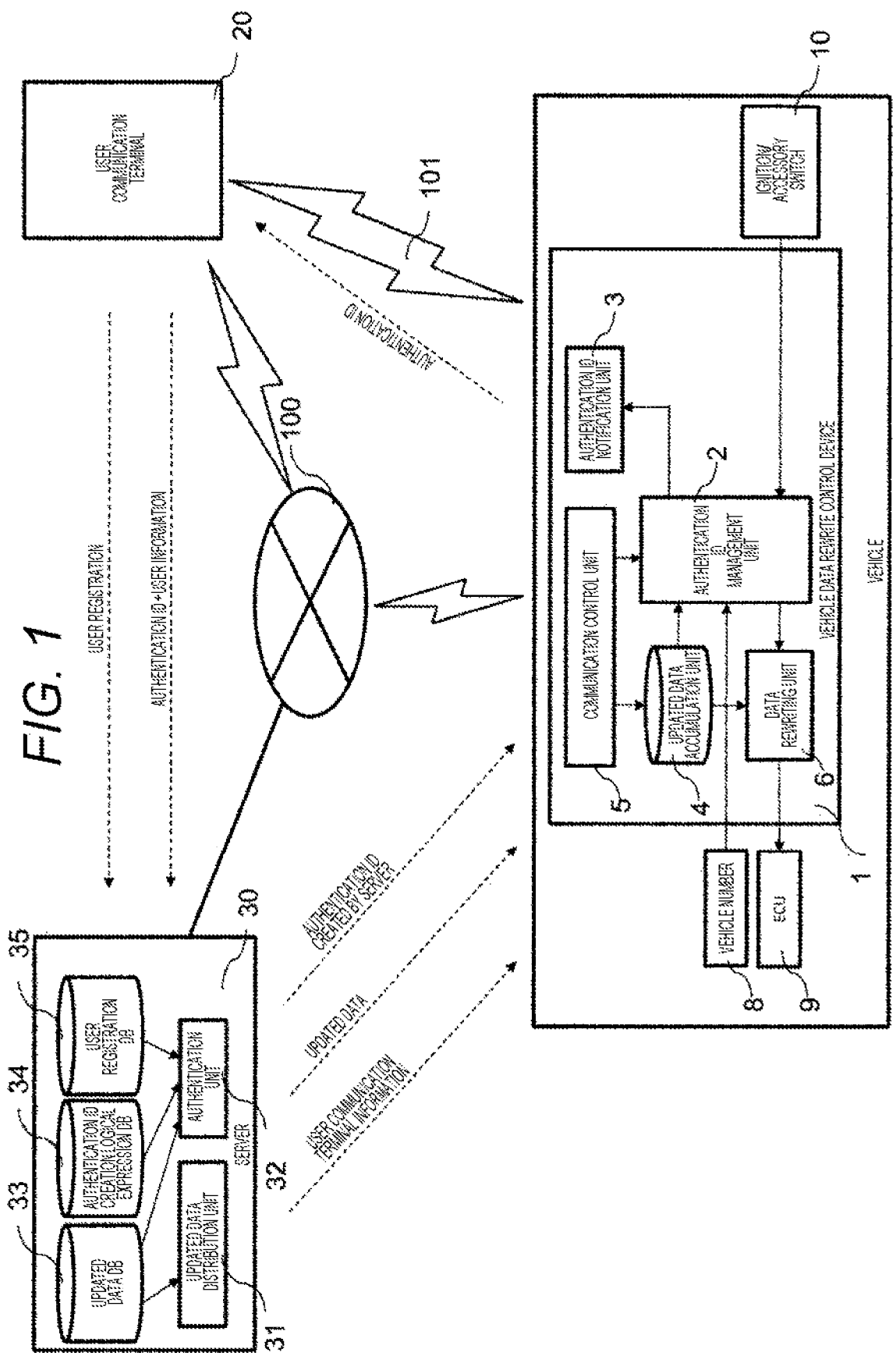
FIG. 1 is a diagram schematically illustrating a vehicle data rewrite control device and a data rewrite authentication system according to a first embodiment of the invention.

The description will be given about the outline of a vehicle data rewrite control device and a data rewrite authentication system using a block diagram of FIG. 1, which are used to rewrite vehicle data according to a first embodiment of the invention. The data rewrite authentication system is configured by a vehicle data rewrite control device 1 which creates an authentication ID (authentication information) in a vehicle, checks the created authentication ID, and rewrites data, a user communication terminal 20 through which a user permits the data rewrite, and a server 30 which distributes update data and notifies the authentication ID to determine the data update permission toward the vehicle.

Specifically, the vehicle data rewrite control device 1 is configured by an authentication ID management unit (authentication information creation unit) 2 which creates the authentication ID (authentication information), an authentication ID notification unit (authentication information notification unit) 3 which notifies the authentication ID to the user, an update data accumulation unit 4 which stores the update data, a communication control unit 5 which performs communication for receiving the update data and the authentication ID, and a data rewriting unit 6 which rewrites data with respect to an ECU 9.

The server 30 is configured by an update data DB 33 which manages the update data, an update data distribution unit 31 which distributes a user registration DB 35 for the management of user information and the update data, and an authentication unit 32 which authenticates the data updating using the user information and the authentication ID from the user communication terminal 20.

Figure 2:
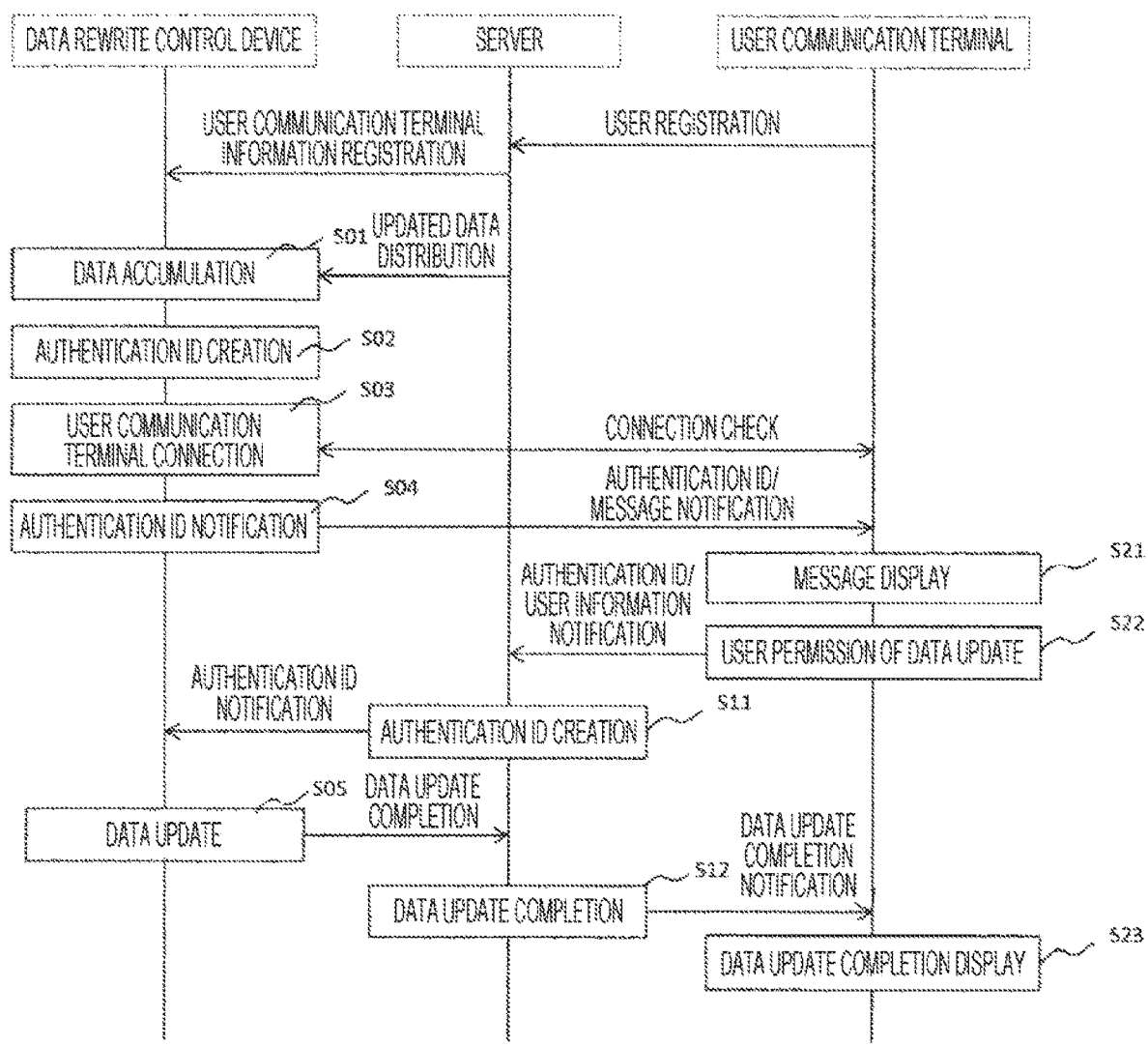
FIG. 2 is a sequence diagram of the vehicle data rewrite control device and the data rewrite authentication system.
Figure 3:
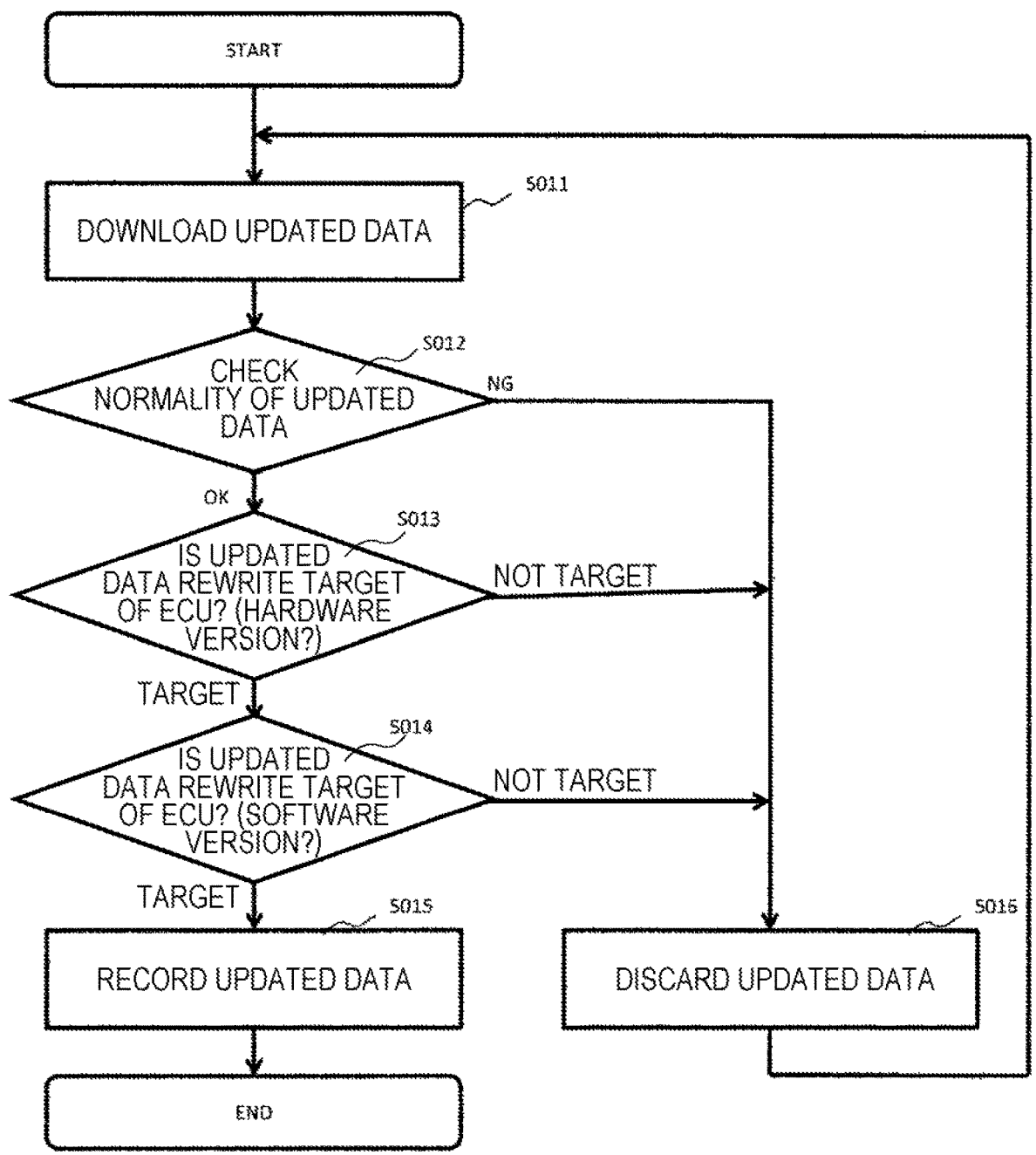
FIG. 3 is a flowchart of recording update data in the vehicle data rewrite control device.
Figure 4:
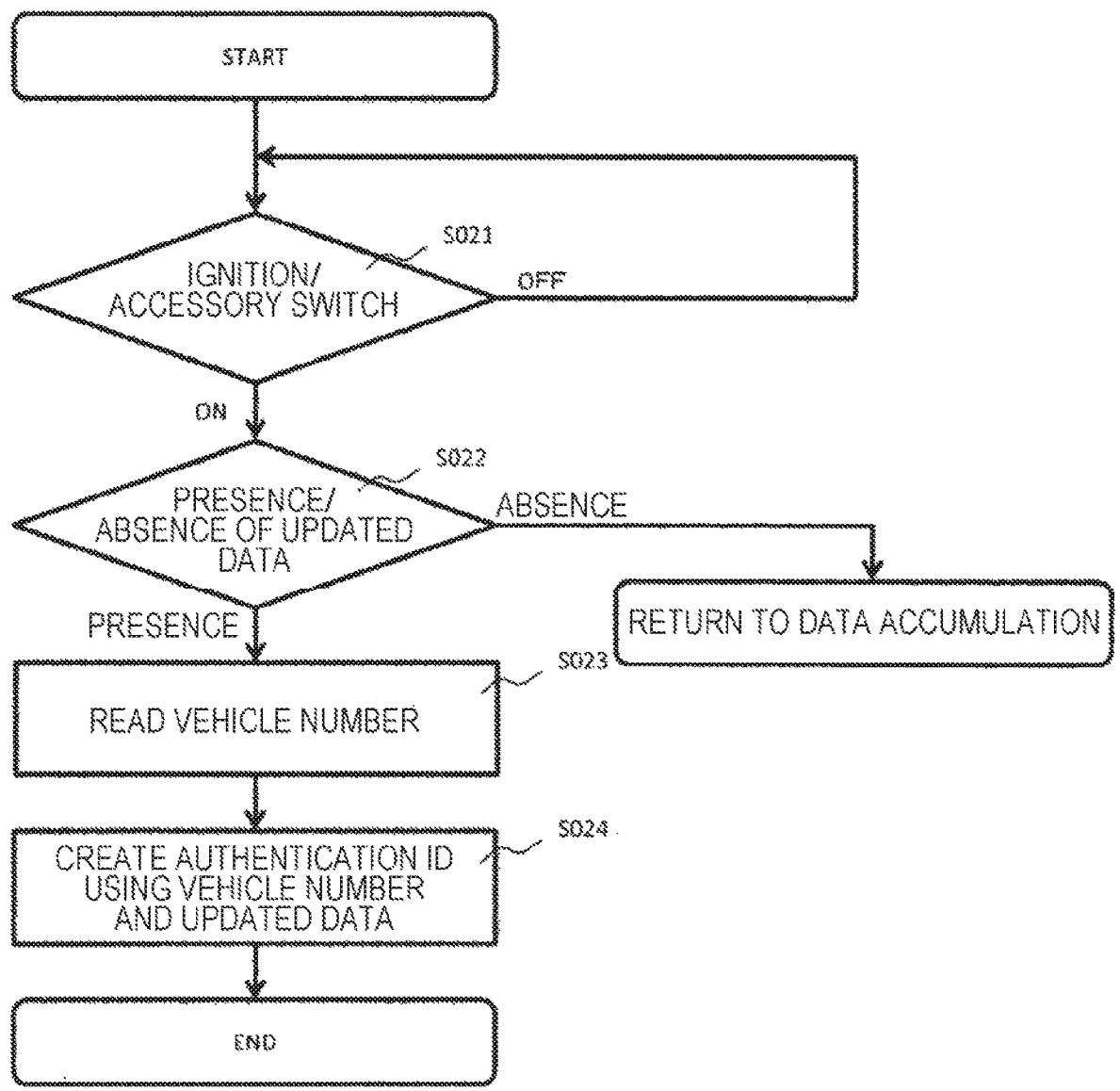
FIG. 4 is a flowchart of creating an authentication ID in the vehicle data rewrite control device.
Figure 5:
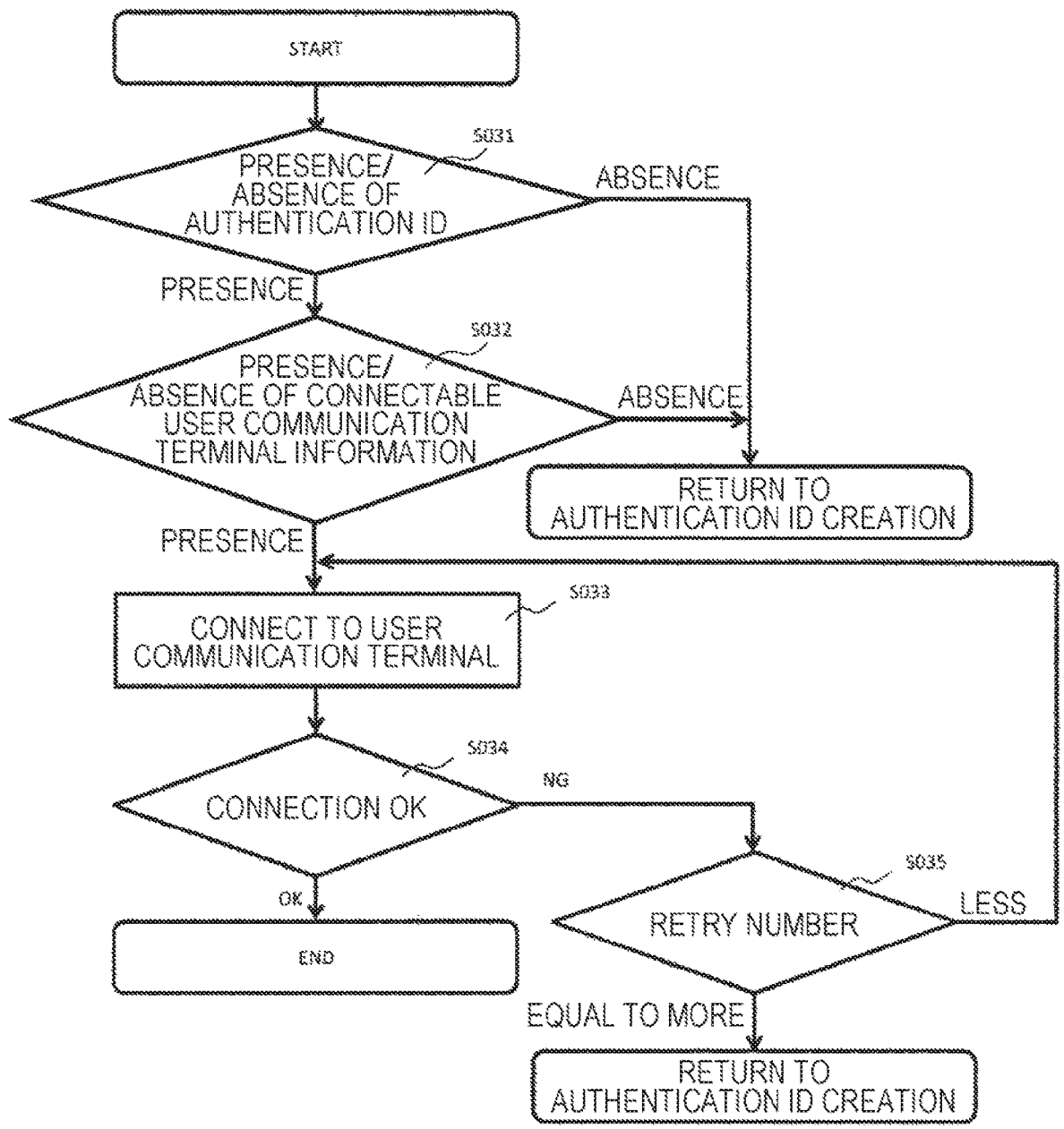
FIG. 5 is a flowchart of connecting a user communication terminal in the vehicle data rewrite control device.
Figure 6:
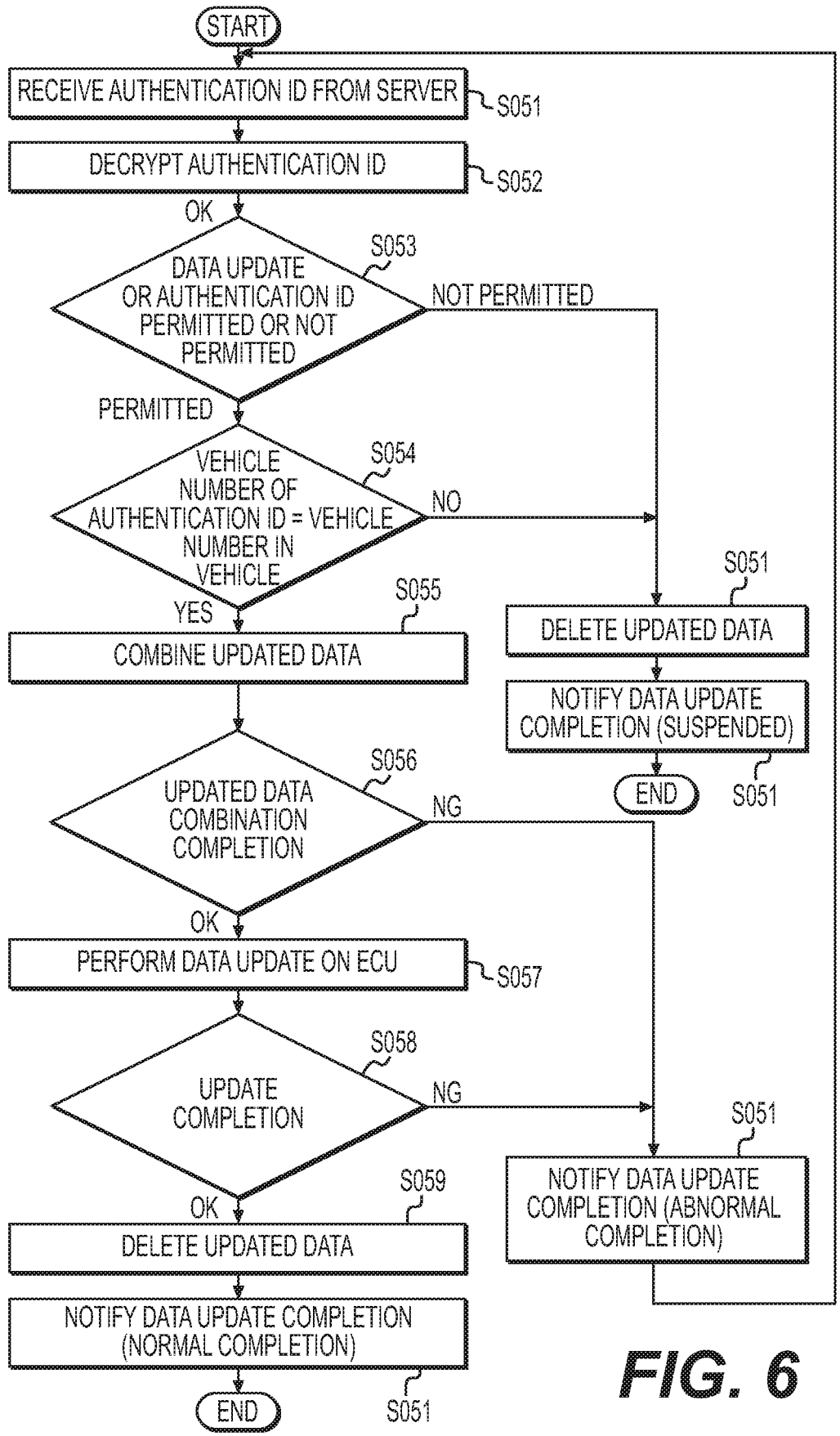
FIG. 6 is a flowchart of updating data in the vehicle data rewrite control device.
Figure 7:
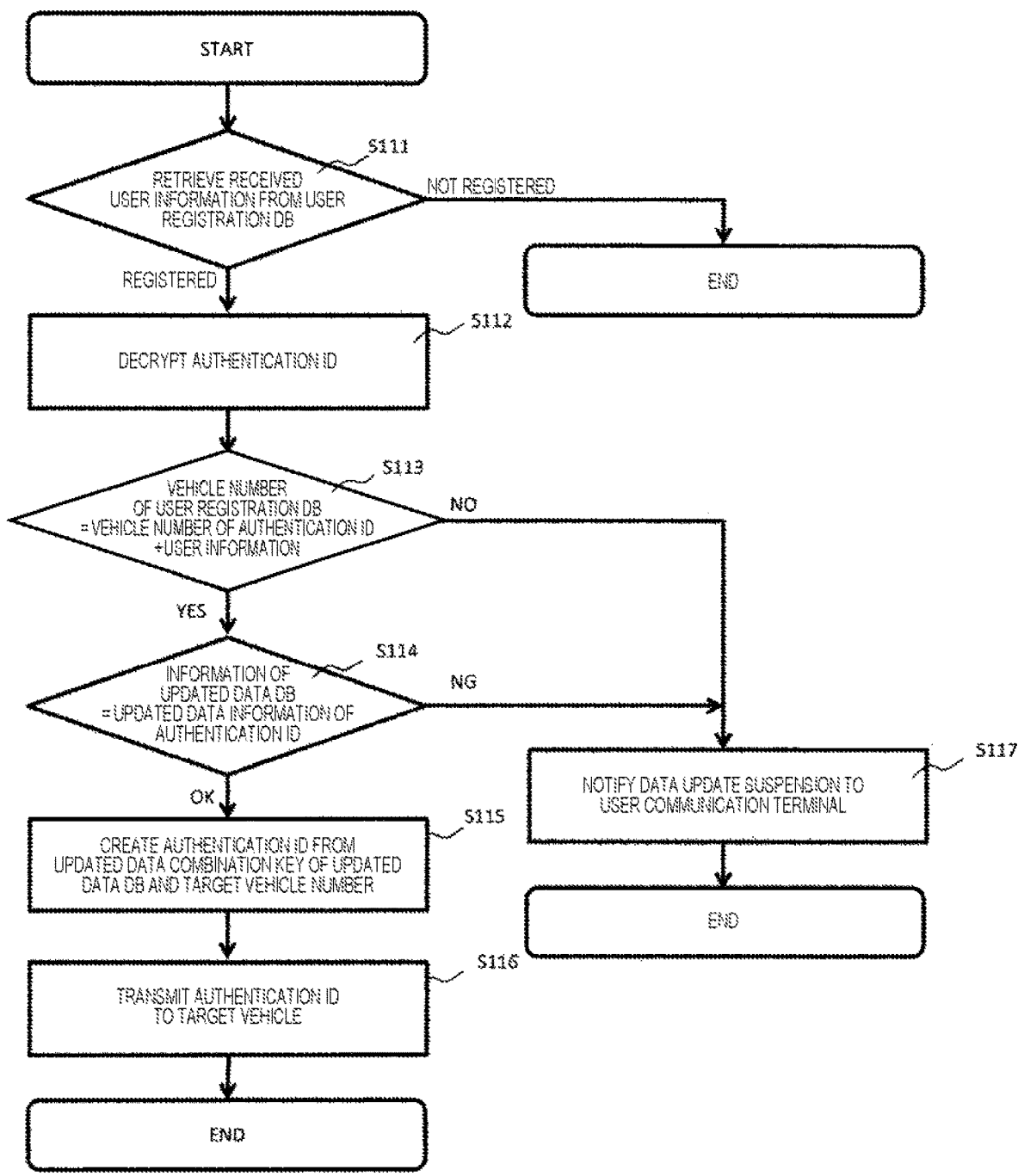
FIG. 7 is a flowchart of creating an authentication ID of a server of the data rewrite authentication system.

FIG. 2 illustrates a sequence of the data updating and the data rewrite authentication system using the vehicle data rewrite control device 1.

The user who receives a service of data updating registers the user communication terminal 20 in the server 30. The server 30 registers user communication terminal information to the vehicle data rewrite control device 1 of the user's vehicle. The server 30 distributes the update data to the vehicle, and the vehicle data rewrite control device 1 which receives the update data accumulates the update data (S01). When an ignition/accessory switch 10 serving as a trigger for creating the authentication ID is turned on, the vehicle data rewrite control device 1 creates an authentication ID using the update data and a vehicle number (S02). The vehicle data rewrite control device 1 checks the connection with the user communication terminal 20 which is registered by the user (S03). The vehicle data rewrite control device 1 notifies the authentication ID to the user communication terminal 20 on which the connection is checked (S04). The user communication terminal 20 displays the notified authentication ID and a message (S21). The user communication terminal 20 approves the user of the data updating through an operation of the user, and notifies the user information and the authentication ID to the server 30 (S22). The server 30 checks the contents of the user information and the authentication ID from the user communication terminal 20, and creates an authentication ID to notify a permission of the data updating. The authentication ID is notified to the vehicle data rewrite control device 1 of a target vehicle (S11). The contents of the authentication ID notified from the server 30 are checked, and the data updating is performed. A result of the performed data updating completion is notified to the server 30 (S05). The server 30 records the result of the data updating completion, and notifies the fact that the data updating is completed to the user communication terminal 20 (S12). The user communication terminal 20 displays the data updating completion to the user (S23). Next, the description will be given about the contents until the user communication terminal information is registered to the vehicle data rewrite control device 1 after the user registration.

In a case where the data of the ECU 9 is updated, the user registers an e-mail address of a smartphone, the user communication terminal information such as an application ID, and a vehicle number 8 of the user to the server 30 through a communication network 100 such as the Internet or at a vehicle dealer. The registered user information is managed in the user registration DB 35. In addition, the user communication terminal information indicating the user communication terminal such as a smartphone is notified from the server 30 to the vehicle data rewrite control device 1 of the registered vehicle number through the communication network 100 such as the Internet on the basis of the registered user information. The authentication ID management unit 2 of the vehicle data rewrite control device 1 stores the user communication terminal information. The user communication terminal information is information for performing WiFi connection with the user communication terminal 20, or for performing wireless communication 101 such as Bluetooth (registered trademark). Recording of the update data distributed from the server 30 in the vehicle data rewrite control device 1 will be described (S01). The server 30 distributes the update data from the update data DB 33 to the vehicle data rewrite control device 1 through the communication network 100 such as the Internet, a public network, or data information of broadcasting waves such as FM and terrestrial waves. The distributed update data is downloaded to the update data accumulation unit 4 using the communication control unit 5 of the vehicle data rewrite control device 1 (S011). The downloaded update data is checked in normality such as a CRC check and a SUM check (S012). In addition, it is determined whether the update data is rewrite data with respect to the ECU 9 of the vehicle using a maker number and a hardware version of the ECU 9 (S013). In a case where the update data is data of the ECU 9 in the vehicle, a software version of the target ECU 9 is checked, and it is determined whether the update data is a software version, and it is checked whether the ECU is a target (S014). In a case where it is checked that the update data is normal (OK) in S012 and the results of S013 and S014 show that the update data is the target data, the update data is recorded in the update data accumulation unit 4. In addition, in a case where it is checked that the update data is not normal (NG) in S012 or the results of S013 and S014 show that the update data is not the target data, the update data is discarded.

The description will be given about the contents until the authentication ID of the vehicle data rewrite control device 1 is created after a trigger of creating the authentication ID is detected (S02). The authentication ID management unit 2 of the vehicle data rewrite control device 1 checks an ON state of the ignition/accessory switch 10 (S021), and checks the presence/absence of the update data of the update data accumulation unit 4 (S022). In a case where there is no update data, the procedure returns to the data accumulation (S01 of FIG. 2). In addition, the vehicle number 8 is read (S023), and the authentication ID is created using the vehicle number and the update data (S024).

The description will be given about the contents until the authentication ID is notified to the user communication terminal 20 after the connection to the user communication terminal 20 is checked (S03 to S04). The authentication ID notification unit 3 of the vehicle data rewrite control device 1 checks the presence/absence of the authentication ID (S031). In addition, the authentication ID notification unit 3 checks the presence/absence of the connectable user communication terminal information (S032). In a case where it is checked that there is an authentication ID as a result of S031 and there is a connectable user communication terminal information as a result of S032, the connection is performed on the user communication terminal of the user communication terminal information using the wireless communication 101 such as WiFi connection and Bluetooth (registered trademark) (S033). In a case where there is no authentication ID as a result of S031 or there is no connectable user communication terminal information as a result of S032, the procedure returns to the creating of the authentication ID (S02 of FIG. 2). In a case where the authentication ID notification unit 3 of the vehicle data rewrite control device 1 is not able to be connected to the user communication terminal 20, a predetermined retry number process is repeatedly performed (S035). In a case where the user communication terminal 20 is connected, the authentication ID is transmitted to the user communication terminal 20. In a case where it is checked that the retry number is over as a result of S035, the procedure returns to the creating of the authentication ID (S02 of FIG. 2).

Figure 8A:
FIGS. 8A to 8C are examples of a display screen of the user communication terminal.
Figure 8B:
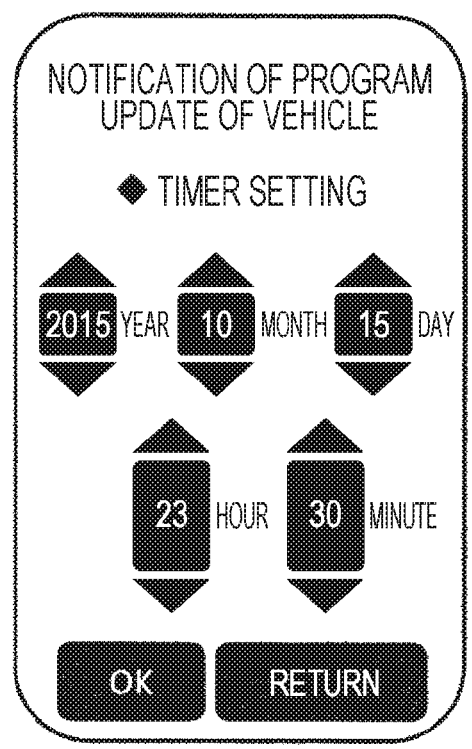

Next, the description will be given about the contents until the data update is approved by the user after the message of the user communication terminal is displayed (S21 to S22). The user communication terminal 20 received the authentication ID from the vehicle data rewrite control device 1 displays a screen as illustrated in FIGS. 8(a) and 8(b) with respect to the user, and "accept", "execute now", or "execute at a designated date" of the data update is set. In a case where the user accepts the data update, the user communication terminal information and the authentication ID are notified to the server through the communication network 100 such as the Internet.

The description will be given about the contents until the server creates and notifies the authentication ID after the contents of the authentication ID from the vehicle data rewrite control device 1 is checked (S11). The server 30 retrieves the user communication terminal information from the user registration DB 35, and checks the presence/absence of the registration. In a case where there is no registration, the sequence is ended. In a case where there is registration, the vehicle number and update data information are extracted using an expression which associates the received authentication ID with an authentication ID creation logical expression DB 34, and the extracted vehicle number is compared with the user's registered vehicle number (S113). In addition, the update data designated by the authentication ID is retrieved from the update data DB 33, and the normality of the update data is checked (S114). The authentication ID is created using the update data from the vehicle number checked in normality and the update data DB (S115). The authentication ID created with respect to the vehicle data rewrite control device 1 of the vehicle number is transmitted through the communication network 100 such as the Internet (S116). In a case where the vehicle number of the authentication ID transmitted from the user or the update data has no normality, a notification is performed through the communication network 100 such as the Internet to display the screen as illustrated in FIG. 9(b) in the user communication terminal of the registered user information (S117). The user communication terminal displays the screen as illustrated in FIG. 9(b) with respect to the user. The description will be given about the contents until the data update after the contents of the authentication ID from the vehicle is checked. In (S05), the authentication ID which is received by the vehicle data rewrite control device 1 and created by the server is decrypted (S052), and it is determined whether the data update is permitted or not (S053). In addition, the vehicle number in the authentication ID is compared with the vehicle number in the vehicle (S054).

In a case where the data update is not permitted, or a case where the vehicle numbers are not matched, the update data recorded in the update data storage unit 4 of the vehicle data rewrite control device 1 is discarded (S0511), a data update suspension is sent back as the contents of the data update completion notification (S0512). In a case where the data update is permitted, and the vehicle numbers are matched, an update data combination key in the authentication ID is extracted, and the update data recorded in the update data storage unit 4 of the vehicle data rewrite control device 1 is combined (S055). The CRC check or the SUM check is performed on the combined data to check the normality, and thus it is checked whether the combination of the update data is normally completed (S056). In the case of NG, an abnormal completion is sent back as the contents of the notification of the data update completion. In the case of OK, the data rewriting unit 6 of the vehicle data rewrite control device 1 performs the data update with respect to the ECU 9. In a case where the data update is normally completed, the update data recorded in the update data storage unit 4 of the vehicle data rewrite control device 1 is discarded, the information such as a hardware version and a software version of the updated ECU 9 and the contents of the notification of the data update completion are set as a normal completion of the data update, and sent back (S0510). In a case where the data update is NG, the contents of the notification of the data update completion is set as the abnormal completion and sent back. In addition, in a case where the contents of the notification of the data update completion indicates the abnormal completion, the server 30 can perform the data update again without deleting the update data of the update data storage unit 4 of the vehicle data rewrite control device 1.

The description will be given about the contents until the data update completion is displayed in the user notification terminal 20 after the data update completion is received (S12 to S23). The server 30 records the data update result which is notified from the vehicle data rewrite control device 1.

Figure 8C:
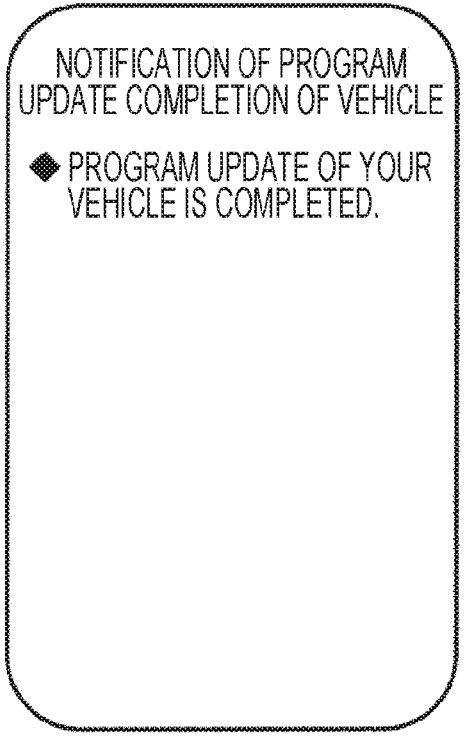

In a case where the data update result notified from the vehicle data rewrite control device 1 is the normal completion, the result of the normal completion of the data update is notified to the user communication terminal 20, the user communication terminal displays a screen as illustrated in FIG. 8(c).

In a case where the data update result notified from the vehicle data rewrite control device 1 is the abnormal completion, the server 30 repeatedly transmits the authentication ID several times. In a case where the data update result indicates the abnormal completion several times, a result of an update failure is notified to the user communication terminal 20, and the user communication terminal displays a screen as illustrated in FIG. 9(a).

In a case where the data update result notified from the vehicle data rewrite control device 1 is suspension, the result of the update failure is notified to the user communication terminal 20, and the user communication terminal 20 displays a screen as illustrated in FIG. 9(b).

Hitherto, as described above, even if there is interception trying to leak out information to the outside, it is possible to prevent an authorized data updating by using the authentication ID which is generated by the update data and the vehicle number. In addition, it is possible to reduce a risk of interception by transmitting the created authentication ID to the user communication terminal using another line. In addition, even if illegal update data is received by spoofing, it is possible to prevent the illegal update data by determining the authentication ID which is received again and permitted in updating.

Second Embodiment

Figure 10:
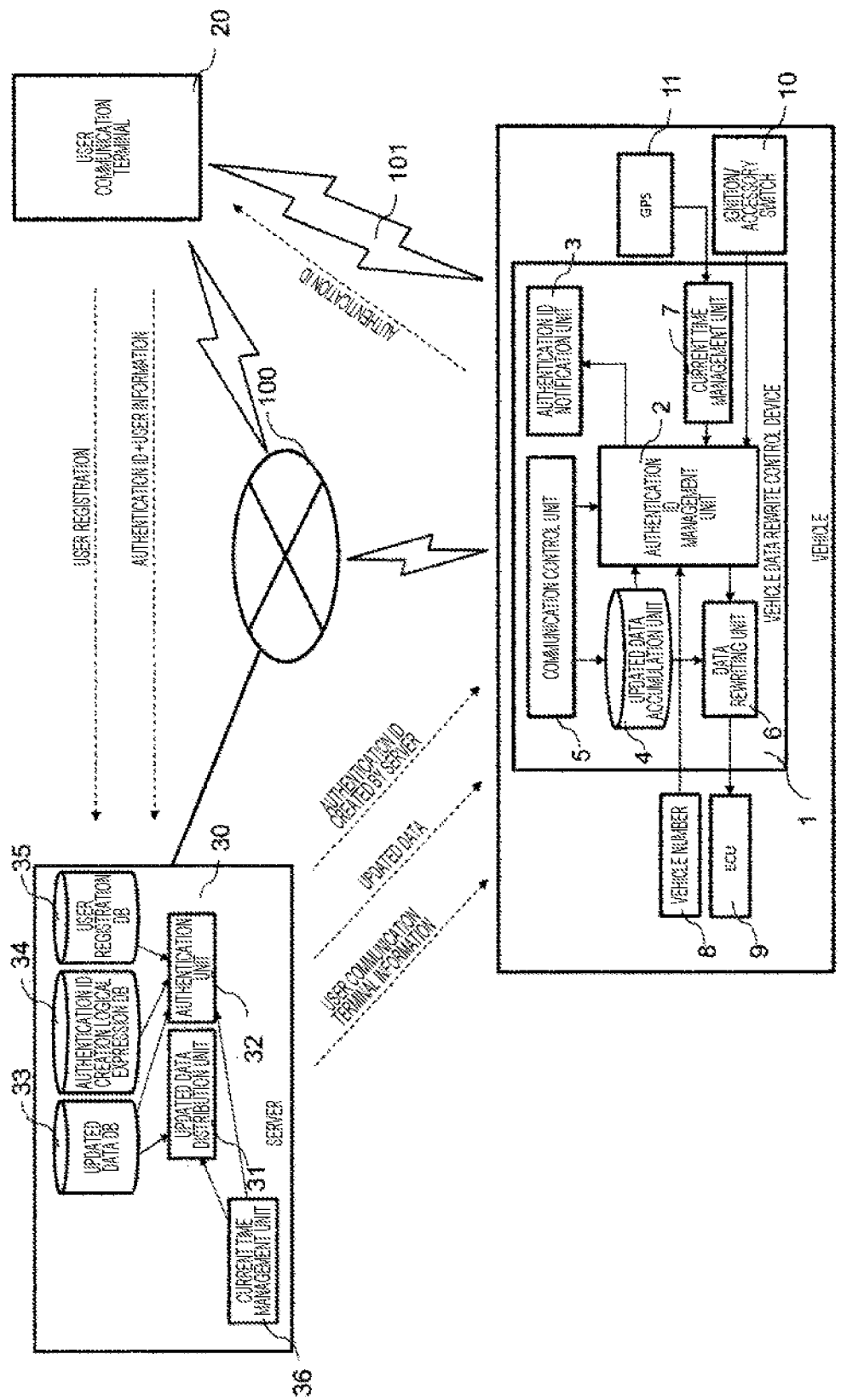
FIG. 10 is a diagram schematically illustrating a system according to a second embodiment of the invention.
Figure 11:
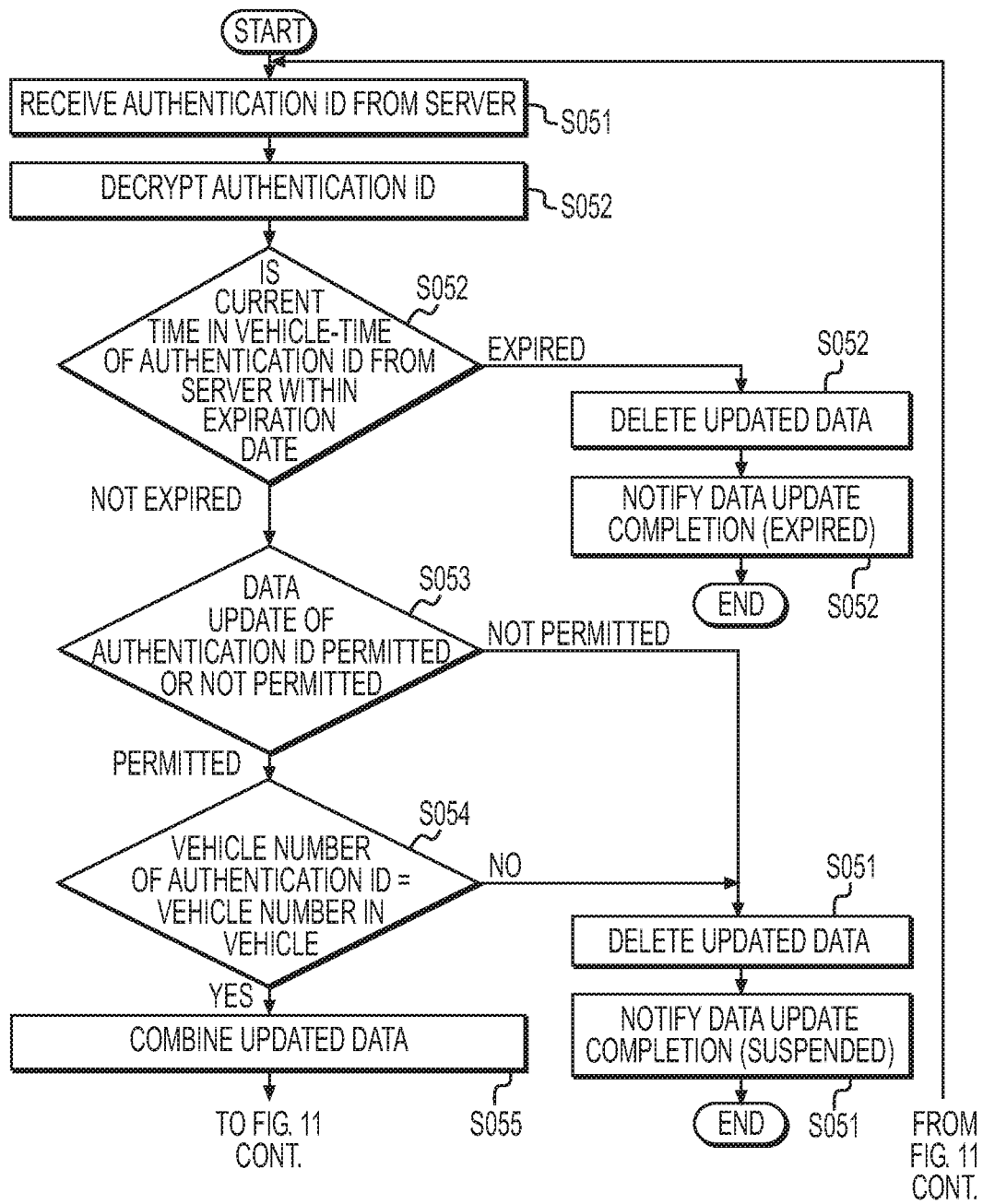
FIG. 11 is a flowchart of creating an authentication ID in a vehicle data rewrite control device according to the second embodiment.
Figure 11:
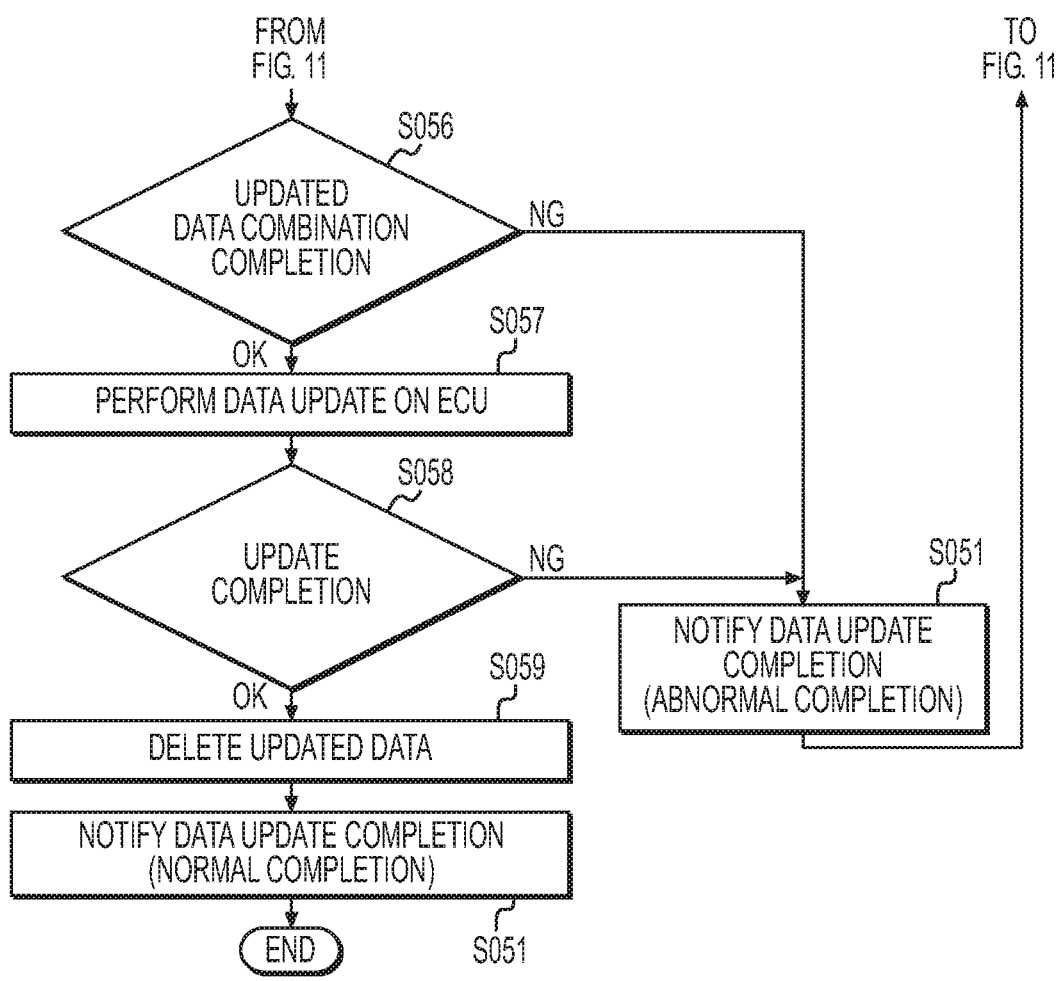
Figure 12:
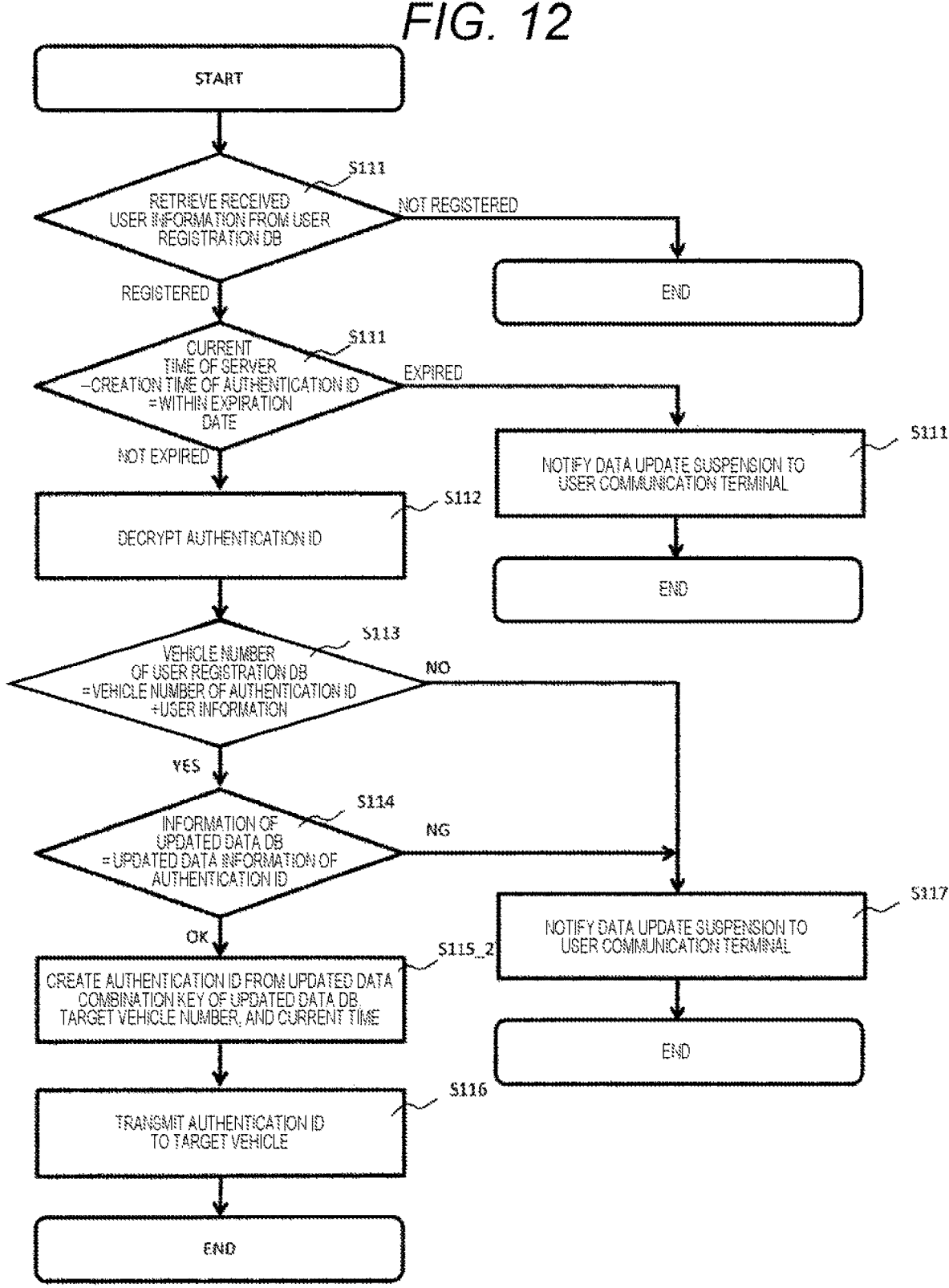
FIG. 12 is a flowchart of creating an authentication ID of a server of a data rewrite authentication system according to the second embodiment.

Next, a second embodiment will be described. In this embodiment, a current time management unit 7 which manages a current time is mounted in the vehicle data rewrite control device 1 as illustrated in FIG. 10. In addition, the server 30 is also mounted with a current time management unit 36. Therefore, the vehicle data rewrite control device 1 uses current time information indicating a time when the authentication ID is created, and the server 30 also uses the current time information indicating a time when the authentication ID is created. As illustrated in FIG. 11, in a case where the device performing the authentication checks the authentication ID as a data rewrite authentication method, the creating time and the current time of the authentication ID are checked to determine whether it is within an expiration date.

The authentication ID created by the authentication ID management unit 2 of the vehicle data rewrite control device 1 is created using the current time of the current time management unit 7, the vehicle number, and the update data.

The current time from a GPS 11 is set to the current time management unit 7 of the vehicle data rewrite control device 1. The authentication ID received from the server is analyzed, and the time when the authentication ID is created is compared to the current time of the current time management unit 7 of the vehicle data rewrite control device 1, and thus it is determined whether the creation time is within the expiration date. In a case where the creation time is not within the expiration date, an expiration is sent back to the server 30 through the communication network 100 such as the Internet when the data update completion is notified. The server notifies the expiration to the user communication terminal 20, and the user communication terminal displays a screen as illustrated in FIG. 13.

The server 30 analyzes the authentication ID notified from the user communication terminal 20, checks the time indicating when the authentication ID is created. In a case where the creation time is not within the expiration date, the expiration is notified to the user communication terminal 20, and the user communication terminal 20 displays a screen as illustrated in FIG. 13.

The contents other than the above description are the same as those of the first embodiment.

Third Embodiment

Figure 14:
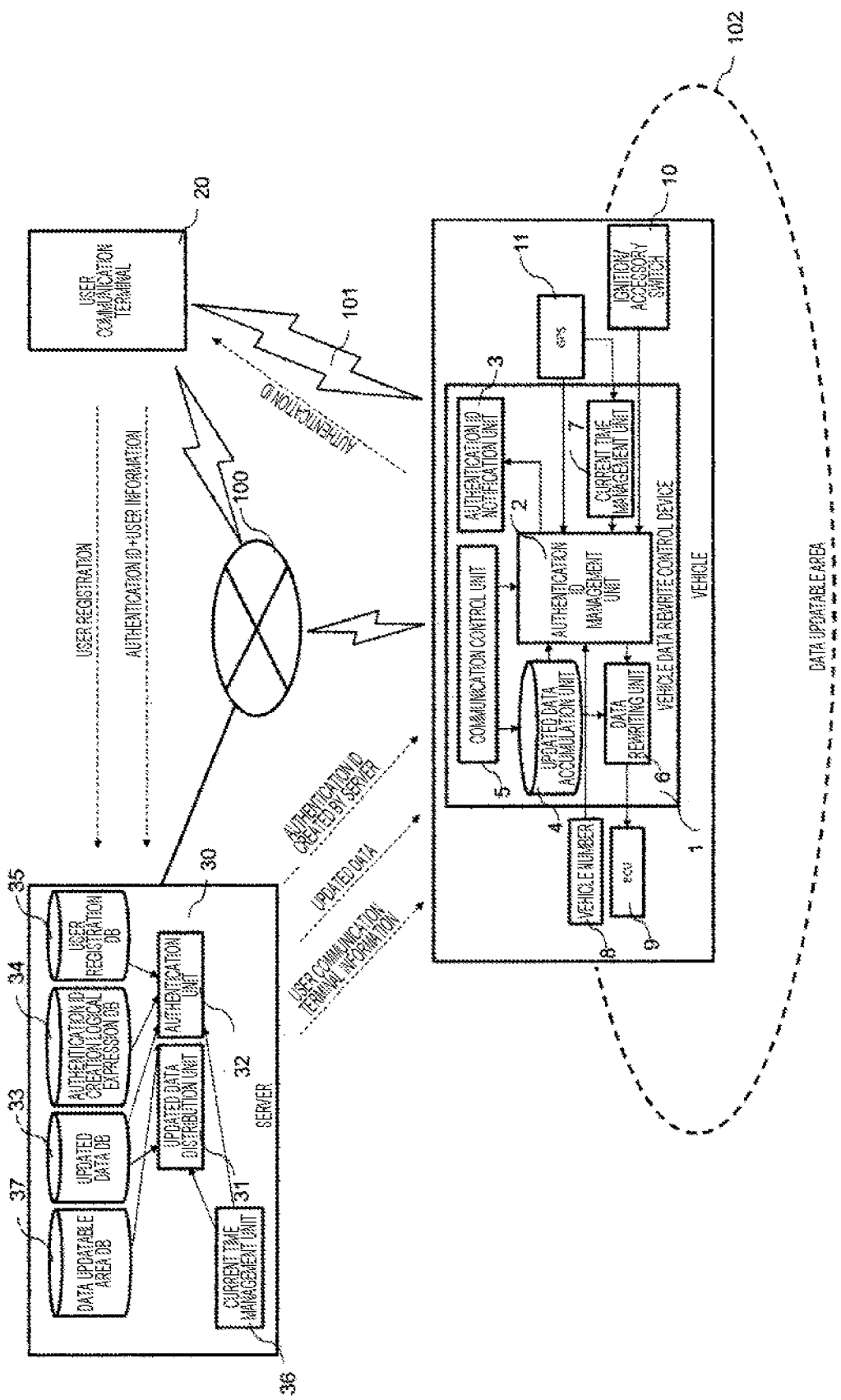
FIG. 14 is a diagram schematically illustrating a system according to a third embodiment of the invention.

Next, a third embodiment will be described. In this embodiment, as illustrated in FIG. 14, a vehicle location received from the GPS 11 is used as the authentication ID created by the authentication ID management unit 2 of the vehicle data rewrite control device 1. In addition, the server 30 specifies an area where the data update can be performed from a data updatable area DB on the basis of the vehicle location of the received authentication ID, and uses the area for the authentication ID created by the server 30. The authentication ID management unit 2 of the vehicle data rewrite control device 1 checks whether the authentication ID is within the data updatable area on the basis of the vehicle location acquired from the GPS 11. In a case where the authentication ID is within the area, the data update is performed.

The authentication ID created by the authentication ID management unit 2 of the vehicle data rewrite control device 1 is created using the vehicle location, the vehicle number, the update data, and the current time received from the GPS 11.

Figure 16:
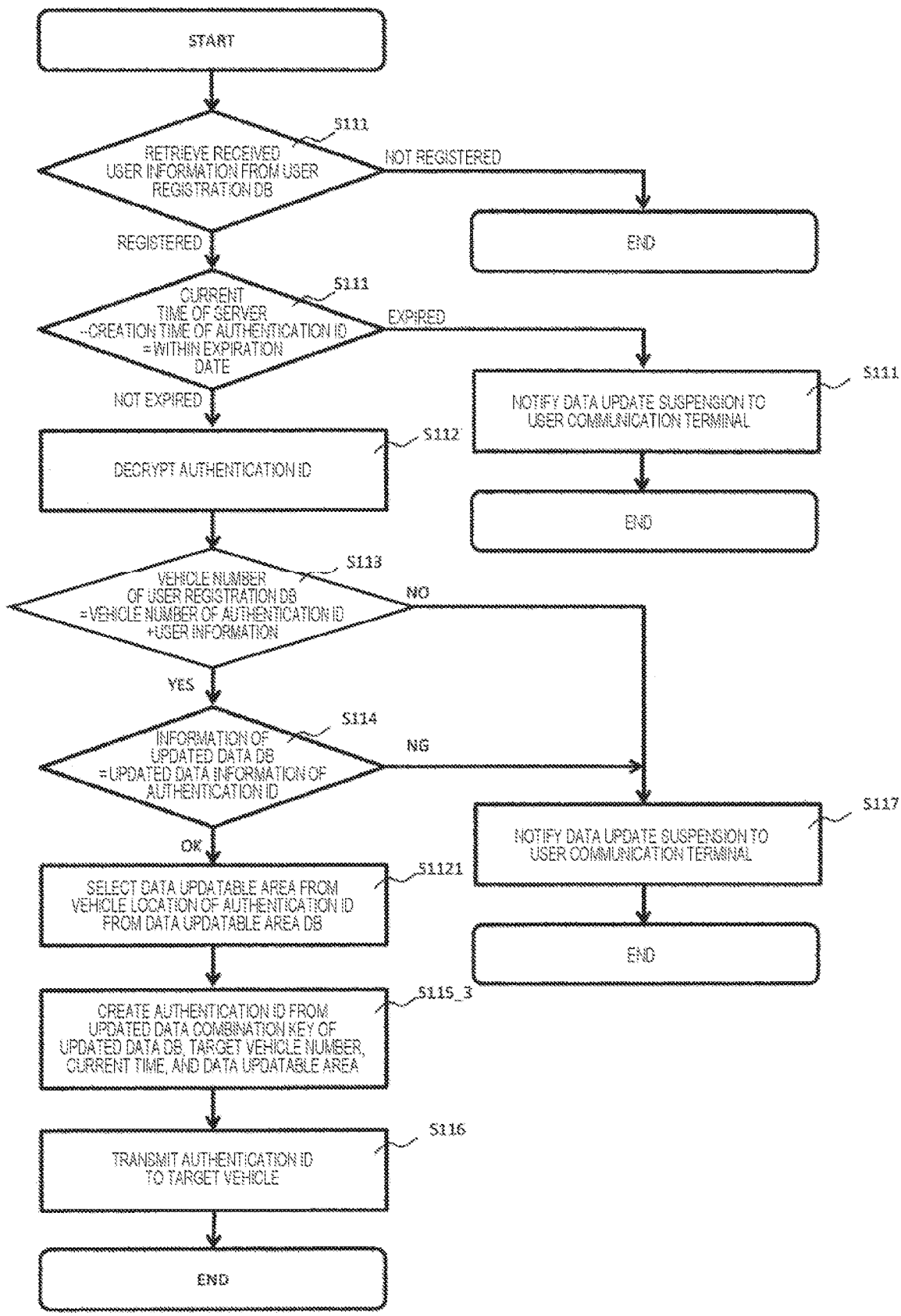
FIG. 16 is a flowchart of creating an authentication ID of a server of a data rewrite authentication system according to the third embodiment.

The server 30 selects a data updatable area on the basis of the vehicle location of the authentication ID from the vehicle as illustrated in FIG. 16 (S1121). The authentication ID is created on the basis of the selected data updatable area, the vehicle number, the update data combination key, and the current time (S115_3).

Figure 15:
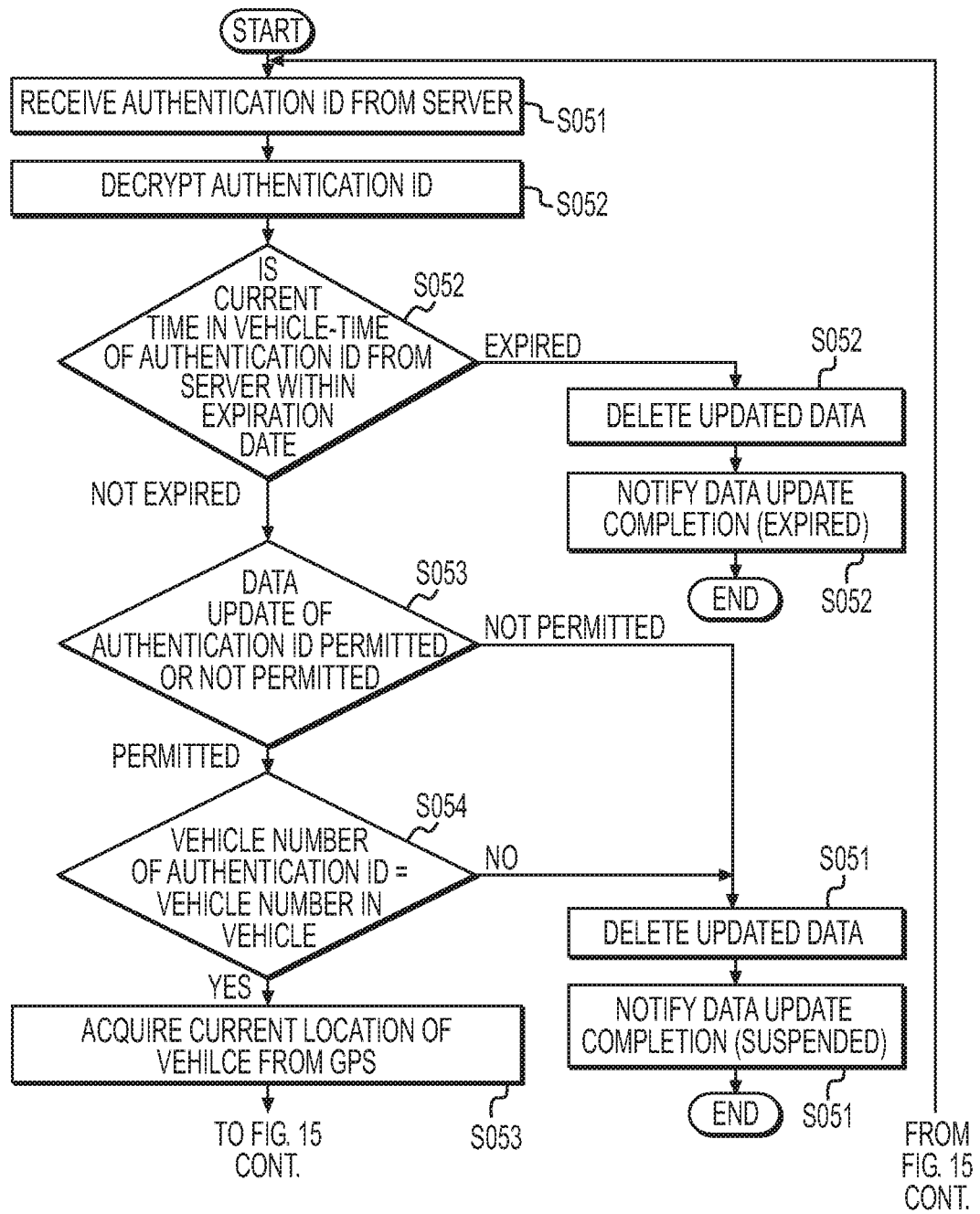
FIG. 15 is a flowchart of creating an authentication ID in a vehicle data rewrite control device according to the third embodiment.
Figure 15:
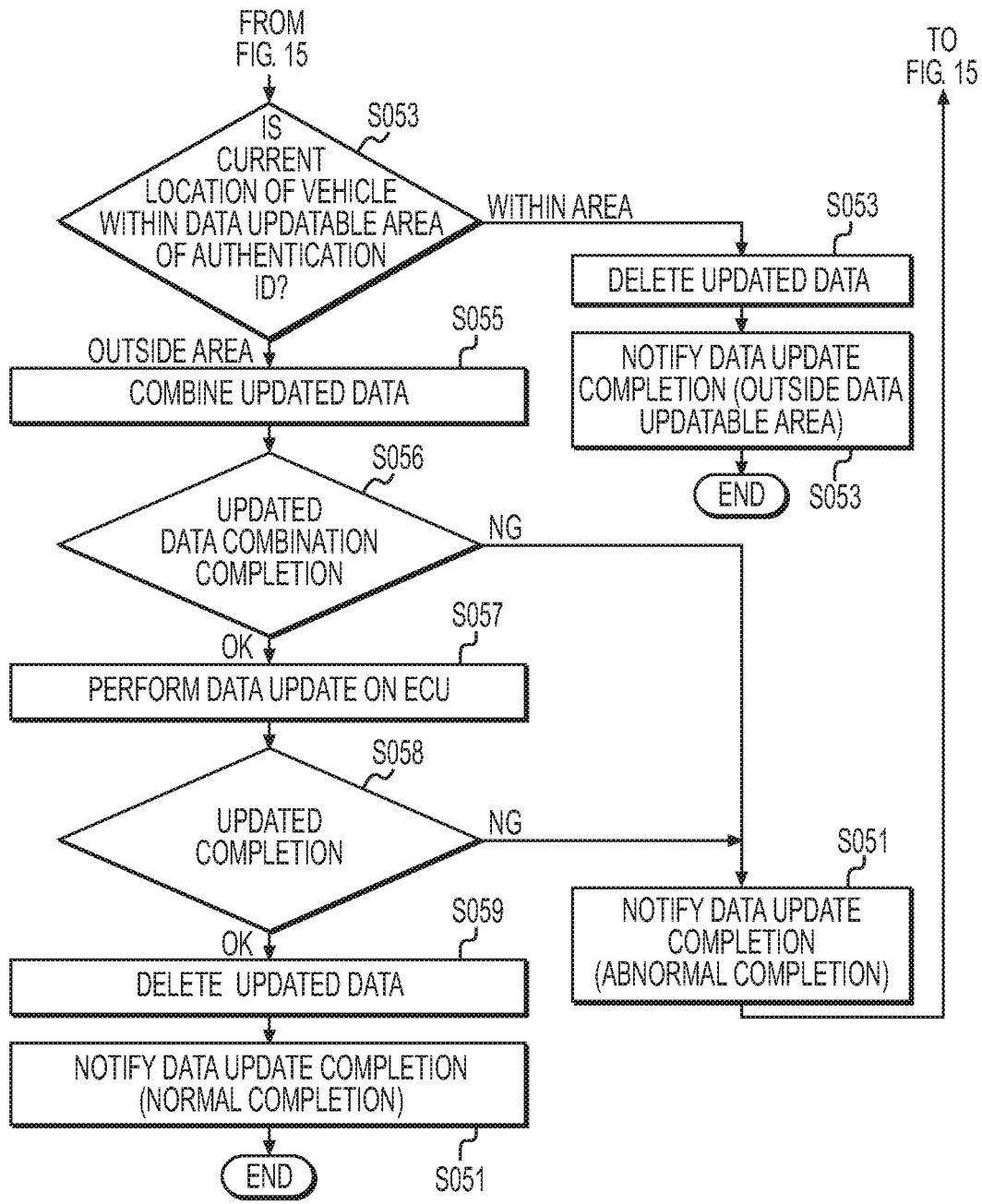

The authentication ID management unit 2 of the vehicle data rewrite control device 1 acquires the current vehicle location from the GPS 11 as illustrated in FIG. 15 (S0531), and compares the acquired vehicle location and the data updatable area of the received authentication ID. In a case where the authentication ID is within the data updatable area, the same data update as those of the first and second embodiments is performed. In a case where the authentication ID is out of the data updatable area as a comparison result, the data updatable area is sent back to the server to notify the data update completion through the communication network 100 such as the Internet. The sent-back server notifies the expiration to the user communication terminal, and the user communication terminal displays a screen as illustrated in FIG. 17.

The contents other than the above description are the same as those of the first and second embodiments.

REFERENCE SIGNS LIST 1 vehicle data rewrite control device
2 authentication ID management unit (authentication information creation unit)
3 authentication ID notification unit (authentication information notification unit)
4 update data storage unit
5 communication control unit
6 data rewriting unit
7 current time management unit
8 vehicle number
9 ECU
10 ignition/accessory switch
11 GPS
20 user communication terminal
30 server
31 update data distribution unit 32 authentication unit
33 update data DB
34 authentication ID creation logical expression DB
35 user registration DB
36 current time management unit
37 data updatable area DB

The invention claimed is:

1. A data rewrite authentication system, comprising:
an electronic control unit, ECU, which includes pre-stored data to be updated and a vehicle number for a vehicle for which the data is updated, and which generates first authentication information from the data and the vehicle number;
a vehicle which includes a vehicle data rewrite control device to generate and output second authentication information on the basis of the received data from the ECU and the vehicle number; and
a communication terminal of a user of the vehicle which outputs the second authentication information to the ECU in a case where the data update is permitted on the basis of the second authentication information received from the vehicle,
wherein the ECU collates the first authentication information and the second authentication information received from the communication terminal, and determines whether the data update is permitted,
wherein the communication terminal is set to notify the second authentication information from the vehicle, and the second authentication information is output to the set communication terminal, and
wherein the ECU collates a first time in the first authentication information, a second time acquired from a satellite, or a third time of an inner current time, and outputs data to be updated to the vehicle in a case where the data is within a predetermined expiration date.

2. The data rewrite authentication system according to claim 1,
wherein the ECU collates the first time, the second time, or the third time, and discards the pre-stored data to be updated in a case where the data is out of the predetermined expiration date.

3. The data rewrite authentication system according to claim 1,
wherein the ECU collates first vehicle location information in the first authentication information and second vehicle location information acquired from a satellite, and outputs the data to be updated to the vehicle in a case where the vehicle is within a predetermined data update area.

4. The data rewrite authentication system according to claim 3,
wherein the ECU collates the first vehicle location information and the second vehicle location information, and discards the pre-stored data to be updated in a case where the vehicle is out of a predetermined data update area.

5. An apparatus comprising:
an electronic control unit, ECU, which includes pre-stored data to be updated and a vehicle number for a vehicle for which the data is updated, and which generates first authentication information from the data and the vehicle number;
a vehicle data rewrite control device, disposed in a vehicle, configured to generate and output second authentication information on the basis of the received data from the ECU and the vehicle number; and
a communication terminal of a user of the vehicle which outputs the second authentication information to the ECU in a case where the data update is permitted on the basis of the second authentication information received from the vehicle,
wherein the ECU collates the first authentication information and the second authentication information received from the communication terminal, and determines whether the data update is permitted,
wherein the communication terminal is set to notify the second authentication information from the vehicle, and the second authentication information is output to the set communication terminal, and
wherein the ECU collates a first time in the first authentication information, a second time acquired from a satellite, or a third time of an inner current time, and outputs data to be updated to the vehicle in a case where the data is within a predetermined expiration date.

6. The apparatus according to claim 5, wherein the ECU collates the first time, the second time, or the third time, and discards the pre-stored data to be updated in a case where the data is out of the predetermined expiration date.

7. The apparatus according to claim 5, wherein the ECU collates first vehicle location information in the first authentication information and second vehicle location information acquired from a satellite, and outputs the data to be updated to the vehicle in a case where the vehicle is within a predetermined data update area.

8. The apparatus according to claim 7, wherein the ECU collates the first vehicle location information and the second vehicle location information, and discards the pre-stored data to be updated in a case where the vehicle is out of a predetermined data update area.

* * * * *